April 1, 1958     R. P. STONEHILL     2,829,243
LIGHTING FIXTURE OF THE RECESSED TYPE
Filed Aug. 4, 1955     2 Sheets-Sheet 1
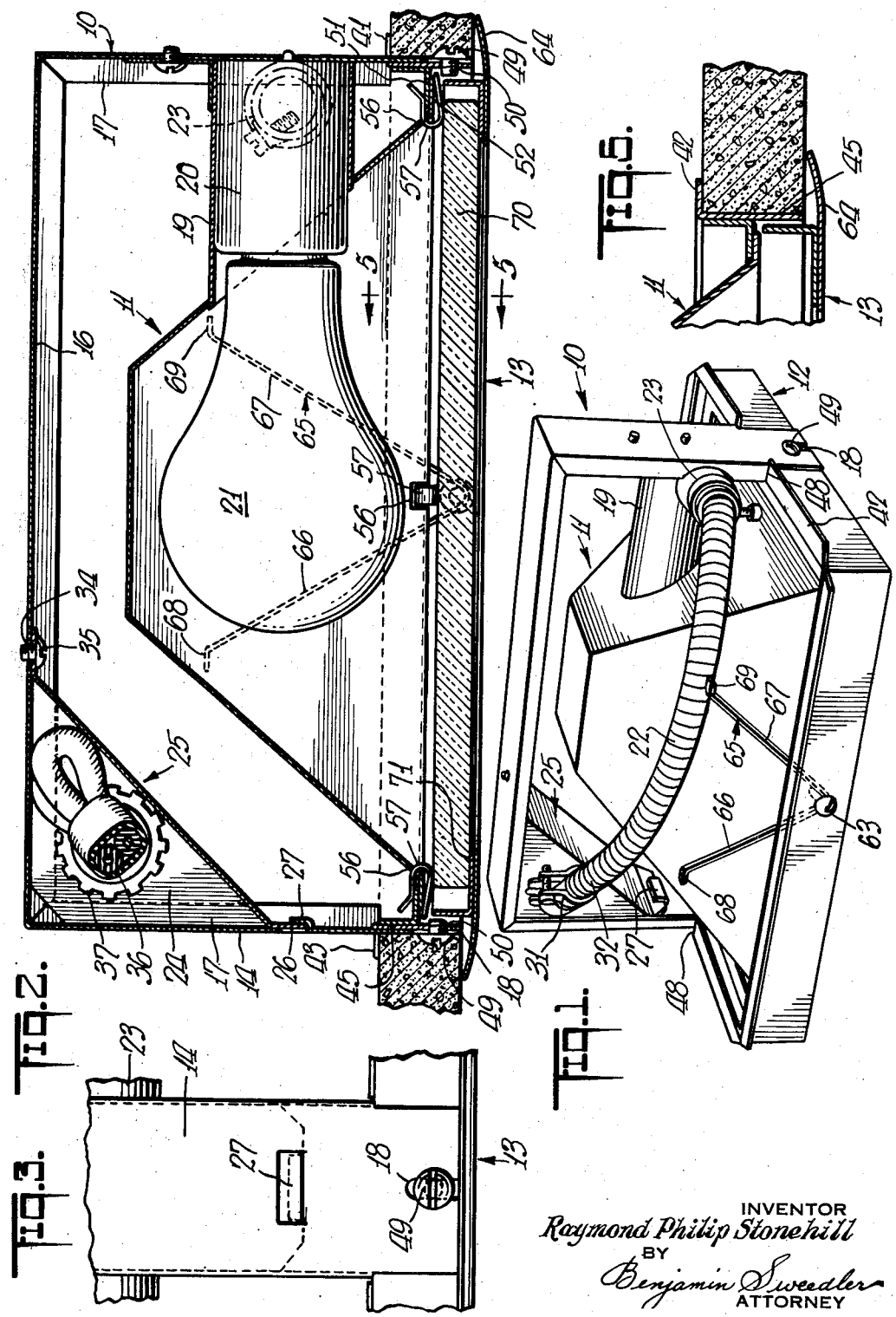
INVENTOR
Raymond Philip Stonehill
BY
Benjamin Sweedler
ATTORNEY

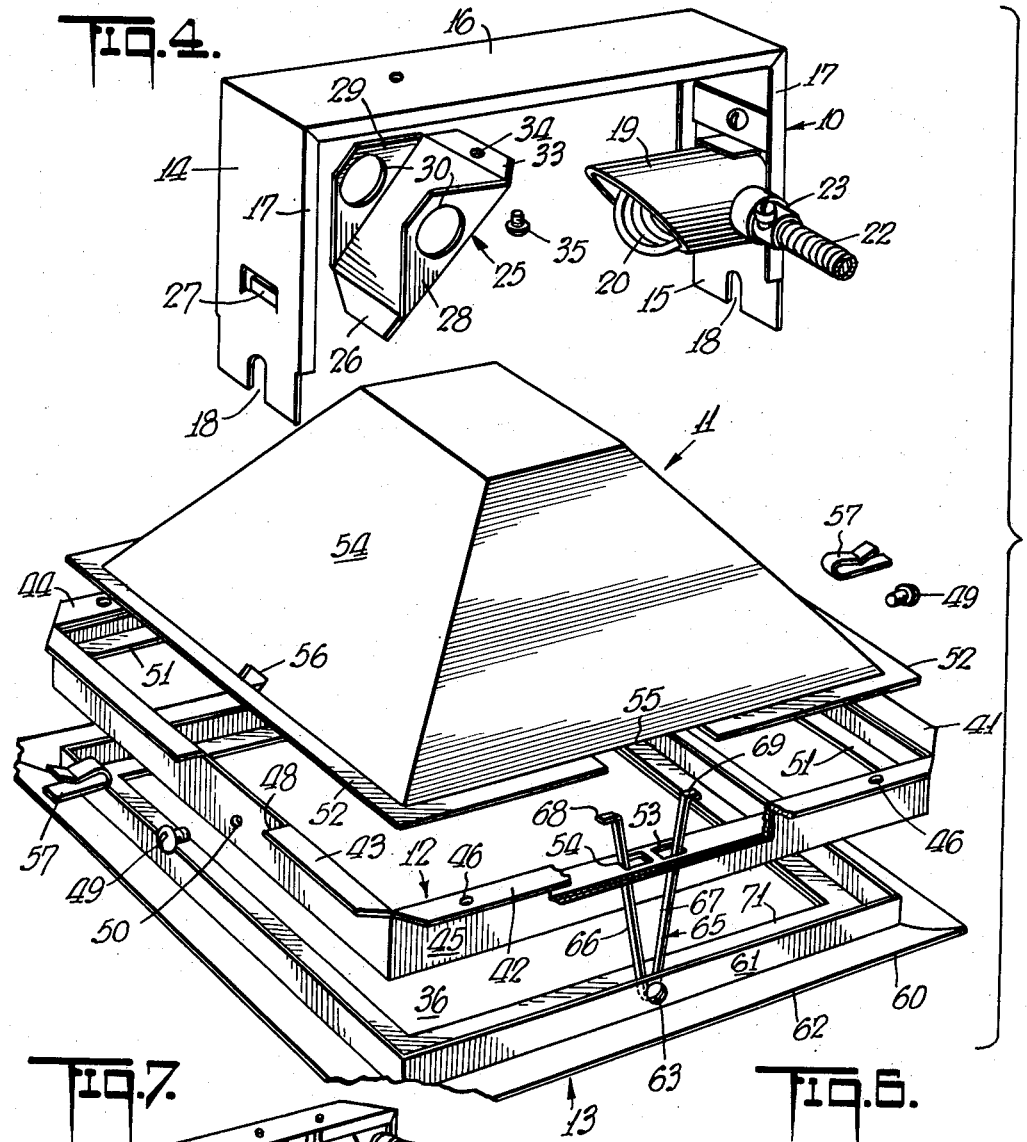

United States Patent Office  2,829,243
Patented Apr. 1, 1958

2,829,243

LIGHTING FIXTURE OF THE RECESSED TYPE

Raymond Philip Stonehill, West Hempstead, N. Y., assignor to The Stonehill Company, Brooklyn, N. Y., a partnership Application August 4, 1955, Serial No. 526,512

7 Claims. (Cl. 240—78)

This invention relates to a lighting fixture of the recessed type, i. e., of the type in which the fixture housing is recessed in the ceiling or wall of a building.

It is among the objects of the present invention to provide a recessed type of lighting fixture which obviates the necessity of using a separate plaster frame in forming the opening in which the fixture is to be disposed.

It is another object of this invention to provide such fixture which will allow free circulation of air, particularly in the neighborhood of the lamp socket where maximum temperatures are generated, and which permits ready access to the portion of the ceiling or wall in which the fixture may be disposed beyond the fixture, and also to the junction box or splice compartment of the fixture.

It is still another object of this invention to provide such fixture having an open frame work which permits the insertion of hands or tools into and through the fixture to form the necessary junction between the building wire and the fixture wire and permits the installer to readily observe whether the fixture is properly installed.

Still another object of the invention is to provide such fixture in which the cover frame as well as the lens or light-transmitting plate are readily removable, thus giving access to the reflector, which is also readily removable and which, when removed, permits access to the junction box and the space beyond the fixture in the ceiling or wall in which the fixture may be disposed.

It is still another object of this invention to provide such fixture having a built-in junction box or splice box obviating the necessity of using an auxiliary junction box and which is pre-wired from the socket or lamp holder to the junction box so that it is only necessary for the electrician in installing the fixture to join the building wire with the fixture wire in the built-in junction box or splice compartment.

Other objects and advantages of this invention will be apparent from the following detailed description thereof.

In the accompanying drawings forming a part of this specification and showing, for purposes of exemplification, preferred forms of this invention, without limiting the claimed invention to such illustrative instances:

Figure 1 is a perspective view of a fixture embodying this invention in which the lamp is shown in a substantially horizontal position relative to the fixture;

Figure 2 is a vertical section through the fixture of Figure 1 on a somewhat larger scale than Figure 1;

Figure 3 is a fragmentary elevational detail showing the removable mounting for the bridge frame and also the pivotal mounting for one end of the housing of the junction box;

Figure 4 is an exploded perspective view showing the different parts of the fixture of Figures 1 to 3, inclusive, the lens or light-transmitting plate being omitted;

Figure 5 is a fragmentary vertical section through a wall or ceiling in which the fixture may be mounted, taken on lines 5—5 of Figure 2, and discloses the utilization of the reversible frame as a plaster frame;

Figure 6 is a similar fragmentary vertical section disclosing the reverse position of the reversible frame in which the flange thereof bears against a ceiling or wall; and Figure 7 is a perspective view of a modified form of the invention in which the lamp is disposed in a substantially vertical position relative to the fixture.

Referring first to Figure 4 of the drawings, the main parts of the fixture of this invention are a removable bridge frame 10, a removable reflector 11, a reversible frame 12 adapted for use as a plaster frame, if so desired, and a removable cover frame 13.

In the embodiment of the invention shown in the drawings, the bridge frame 10 is constituted of vertical legs 14 and 15 connected by the cross-piece 16 all having side flanges 17 which flanges terminate near the ends of the legs leaving the extremities of the legs perfectly flat. The leg extremities are formed with openings or slots 18. Leg 15 of the bridge frame has suitably mounted thereon a socket or lamp holder 19 which may be of any conventional type and is provided with a threaded socket 20 for receiving the lamp bulb 21 (Figure 2). Flexible cable 22 carrying the fixture wire having a heat resistant covering such as silicone rubber thereon has end 23 suitably joined to the socket 20.

The junction box or splice compartment 24 (Figure 2), desirably of triangular shape, is formed in a corner of the removable bridge frame 10 by means of a housing 25 having a depending flange 26 pivoted on supporting member 27 struck out of the leg 14, as clearly shown in Figure 4. Housing 25 is formed with side walls 28, 29 having openings 30 therein. The opening 30 in one of the side walls 28, 29 has suitably fastened thereto as by a clamp 31 (Figure 1) end 32 of the flexible cable 22. Through the opening 30 in the other of the side walls 28, 29 the building wire may be passed so that it can be joined to the heat resistant insulated wire in the flexible cable 22.

A flange or extension 33 having therein a threaded opening 34 is formed on the housing 25, this flange being horizontally positioned so that, as best shown in Figure 2, it lies flush against the underside of the cross-member 16 for reception of a threaded bolt 35 which locks the housing 25 in place. When it is desired to remove the housing, for example, in order to join the building wire to the fixture wire, it is only necessary to remove the bolt 35 which permits removal of the housing 25 from the bridge frame 10. The building wire may be then passed through the appropriate opening 30 and joined to the fixture wire which, desirably, is disposed within the junction box 24 when the fixture is assembled at the factory at which point in the manufacture of the fixture the flexible cable has its ends fastened to the lamp socket 20 and one of the openings 30 in the junction box 24. Thus the building wire and fixture wire may readily be joined to form the joint 36 (Figure 2) securely held by lock nut 37. Thereafter the housing 25 may be secured in place. In this way formation of the joint between the building wire and the fixture wire is facilitated and the necessary splicing of these two wires may be effected even with the fixture in place since, as pointed out more fully hereinafter, the reflector 11 is removable and access to the junction box may readily be had through the opening 36 in the removable cover frame 13.

The removable bridge frame 10 is secured by threaded bolts 49, to the reversible frame 12. In the embodiment of the invention shown in the drawing, frame 12 is rectangular in shape and is formed with side flanges 41, 42, 43 and 44 extending laterally away from the vertical walls 45 defining the interior of the frame. These flanges extend from one end of the vertical walls 45 defining the frame and desirably are provided with openings 46 for the reception of screws or bolts to secure the frame to the ceiling or wall when the reversible frame is installed, as shown in Figure 6, with the flanges 41, 42, 43 and 44 resting on a ceiling or wall. When the reversible frame is employed as a plaster frame, the flanges 41, 42, 43 and 44 rest on the inside surface of the ceiling, as shown in Figure 5. In this position the vertical walls 45 of the reversible frame 12 function as a plaster frame. In other words, by positioning the frame 12 of the fixture, say, in the ceiling before the plaster is applied, the walls 45 serve as a plaster frame in the construction of the ceiling, eliminating the necessity of utilizing a separate plaster frame to form the desired recessed opening for the fixture.

The bridge frame 10 is removably secured to the reversible frame 12, to permit utilization of the latter as a plaster frame or, alternatively, with the flanges 41, 42, 43 and 44 serving as ceiling or wall flanges, as shown in Figure 6. For this purpose openings 48 are formed in flanges 41 and 43 to receive the extremities of legs 14 and 15. These spaces or openings 48 in the flanges 41, 43 are dimensioned to readily receive the legs 14 and 15. The legs are removably held in position by bolts 49 passing through slots 18 in the legs and arranged to be received by threaded openings 50, in vertical walls 45 of frame 12. Whenever it is desired to reverse frame 12, say, from the relative position shown in Figure 4 to that shown in Figure 6, it is only necessary to loosen the bolts 49, remove the bridge frame 10 from the reversible frame 12, reverse the position of frame 12 so that the flanges are on the base of frame 12, not at the top, and secure the legs 14 and 15 by the bolts 49 passing through slots 18 into threaded openings 50.

Reversible frame 12 is provided with inner flanges 51 extending from the four sides thereof. These flanges provide a seat for the marginal edges of the reflector 11. Inner flanges 51 desirably are formed by suitably securing, as by welding angle irons to the inner sides of walls 45. Each of two of these flanges 51 is provided with a pair of openings 53, 54 for a purpose which will be hereinafter described.

Reflector 11 is desirably of generally truncated, pyramid shape, but may be of any suitable or desired shape. Two marginal edges of the reflector 11 are formed with cutaway portions 55 substantially midway between the ends thereof. Openings 56 are disposed in the sides of the reflector 11 near the base thereof. These openings 56 are adapted to receive spring clips 57 which function to clamp the marginal edges 52 of the reflector to the inner flanges 51 on the reversible frame 12, as clearly shown in Figure 2. In this way the reflector is removably secured to the frame 12.

Cover frame 13 is of generally rectangular shape and is constituted of vertically extending walls 61, the base of which is welded or otherwise suitably secured to the cover plate 62 having rectangular opening 36. Cover plate 62, it will be noted, extends laterally in opposite directions from the base of the vertical walls 61, the marginal edge of this plate 62 being somewhat curved or arced, as at 64. Approximately midway between the sides of frame 13 a pin or bolt 63 is positioned. Desirably two such pins or bolts are provided, one in each of the opposite side walls of the frame 13, although, if desired, only one such pin or bolt may be used. Suitably fastened to this pin or bolt is a flat leaf clamp 65 having the legs 66, 67 thereof terminating in laterally extending projections 68, 69. The legs 65, 66 extend through openings 53, 54 in the flange 51 on the inside of the reversible frame 12.

When the cover frame 62 is in the position shown in Figures 1 and 2, the clamp 65 is under tension and exerts pressure on the side walls of the openings 53 and 54 to maintain the cover plate in closed position and also to retain the lens or light-transmitting plate 70 within the fixture, as shown in Figure 2. In this position the legs 66, 67 of the clamps extend through the opening 55 in the flange 52 of the reflector where they can readily be engaged should it be desired for some reason or the other to have access to the interior of the fixture, for example, to replace the bulb or clean the lens, etc. Whenever it is desired to gain access to the interior of the fixture, it is only necessary to pull downwardly on the cover frame 62 to thus remove this cover frame from its seat. Since the lower end of each leg clamp 65 is fastened to this cover frame, a downward pull on this frame presses the legs 66, 67 of each clamp towards each other, thus reducing the tension on the sides of the openings 53, 54 and permitting the cover frame 13 to be lowered. The lateral extensions 68, 69 will engage the portion of the flange 51 contiguous to the openings 53 and 54, preventing the cover plate from falling accidentally when the cover plate is being removed partially. The leaf clamp 65 is so dimensioned as to permit the cover plate to drop sufficiently to give ready access to the interior of the fixture. Should it be desired to completely remove the cover plate this can be accomplished by removing the clamp 65 from the openings 53, 54; the lateral extensions 68, 69 of the clamp can be withdrawn through openings 53, 54 when the clamp is compressed to permit removal of the cover frame 13.

It will be understood that the inner flange 71 of the cover plate provides a seat for the lens 70.

In the modification of Figure 7 like parts are indicated by the same reference characters followed by a prime sign. This modification differs from that of Figures 1 to 4 inclusive chiefly in that the removable bridge frame 10' is provided with a vertically extending socket or lamp holder 19' which enters through the top 72 of the reflector 11'. It will be understood that in the modification of Figure 7, as well as in that of Figures 1 to 4, inclusive, the frame 12' is reversible so that it can be secured to the bridge frame 10' with the flange 42' disposed so that it is positioned at the base of the reversible frame in the relative position shown, for example, in Figure 6, or, alternatively, in the relative position shown in Figure 7.

The bridge frame, the reversible frame, the junction box and the cover frame desirably are of steel or other metal; the reflector may be of aluminum painted or polished on the reflecting surface. The lamp holder may be of porcelain or other suitable material of construction, and the lens or light-transmitting plate may be of glass. It will be understood that the materials of construction of the component parts may be varied as desired.

It will be noted that the present invention provides a fixture of the recessed type which obviates the necessity of using a separate plaster or opening forming frame in producing the opening in which the fixture is to be disposed because the reversible frame functions as a plaster frame, as hereinabove described.

The bridge frame and the reversible frame, it will be noted, are so related to each other as to leave substantially the entire area of the fixture to the rear of the reversible frame free; hence maximum circulation of air is permitted, particularly in the neighborhood of the lamp socket which represents the portion of the fixture subjected to the highest temperatures. Rapid dissipation of heat in the neighborhood of the reflector, socket enclosure and splice box accordingly takes place with consequent subjection of these parts to lower temperatures.

Since the cover frame and the reflector are both removable, the fixture of this invention permits ready access to the portion of the ceiling or wall in back of the fixture, and also to the junction box in the corner of the bridge frame. Hence, it is possible to insert the hands, or tools, and quickly and readily form the necessary splice joint between building wire and the fixture wire when installing the fixture. Furthermore, the fixture splice box is readily removable through the fixture opening, so that splices can be made below ceiling line where they are visible.

Moreover, the construction of this invention permits the installer to readily observe whether the fixture is properly positioned and secured.

It will be further noted that the bridge and reversible frames can be installed at any time during the ceiling construction without the reflector, glass or glass frame. This permits the installation of these material parts by the workers installing the ceiling, without the necessity of employing an electrician; the latter can complete the installation including the wiring of the fixture at his convenience.

In the fixture of this invention, as shipped from the factory, the flexible cable having the fixture wire is secured in place running from the lamp socket to the junction box. Accordingly, in installing the fixture it is only necessary for the electrician to join the building wire with the fixture wire in the built-in junction box, which, in view of the construction of the fixture hereinabove described permitting ready access to the junction box, can readily and quickly be accomplished with consequent saving of time and labor.

It will also be noted that in the fixture of this invention the pre-wired junction box is located within the confines of the fixture dimensions, i. e., its height, width and length. In other words, the fixture has no projections extending beyond either the extremities of the frame 12 or the top of the bridge frame 10. This facilitates its ready and quick mounting in its receiving recess. Moreover, because of the open structure of the fixture, as shown in the drawings, ducts, pipes and other ceiling or wall members can readily be arranged to bypass the fixture.

The expression "plaster frame" is used herein in a broad sense to define a frame forming an opening in any type construction.

Since certain changes may be made in the above-described lighting fixture and different embodiments of the invention could be made without departing from the scope thereof, it is intended that all matter contained in the above description or shown in the accompanying drawings shall be interpreted as illustrative and not in a limiting sense.

What is claimed is:

1. A recessed type lighting fixture comprising a substantially rectangular reversible frame having inner and outer flanges on the vertical walls defining said frame, a removable reflector adapted to be secured to said inner flanges, a bridge frame constituted of two substantially vertical legs connected by a horizontally extending member arranged to be removably secured to said reversible frame, a socket on one of said legs extending in a substantially horizontal direction, and a junction box on the other of said legs disposed near the upper portion thereof in a corner defined by the top of said other leg and said horizontally extending member.

2. A recessed type lighting fixture comprising a first frame having inner and outer flanges on the vertical walls defining said frame, a reflector secured to said inner flanges, a bridge frame secured to said reversible frame, said bridge frame being relatively narrow relative to the width of said first frame and disposed relative to said reflector so as to provide a relatively large space between the walls of the bridge frame and the outer walls of the reflector for free circulation of air therethrough, a socket extending from the bridge frame into said reflector, and a junction box on said bridge frame disposed in a portion thereof remote from said socket and spaced from the outer walls of the reflector so as to provide a relatively large space between the junction box and the reflector walls for free circulation of air therethrough thereby permitting dissipation of heat emanating from said reflector and maintaining said junction box at a relatively low temperature.

3. A recessed type lighting fixture comprising a reversible frame having inner and outer flanges on the vertical walls defining said frame, a removable reflector adapted to be secured to said inner flanges, a bridge frame arranged to be removably secured to said reversible frame, said bridge frame being relatively narrow relative to the width of said reversible frame and disposed relative to said reflector so as to provide a relatively large space between the walls of the bridge frame and the outer walls of the reflector for free circulation of air therethrough, a socket extending from the bridge frame into said reflector, and a junction box on said bridge frame disposed in a portion thereof remote from said socket and spaced from the outer walls of the reflector so as to provide a relatively large space between the junction box and the reflector walls for free circulation of air therethrough thereby permitting dissipation of heat emanating from said reflector.

4. A recessed type of lighting fixture comprising a first frame constituted of vertical walls having a first flange extending laterally from one end of said walls and a second flange extending laterally in the opposite direction than that of said first-mentioned flange, a bridge frame secured to said first-mentioned frame, said bridge frame being relatively narrow with respect to the width of said first-mentioned frame to provide relatively large open spaces on opposite sides of said bridge frame for free circulation of air therethrough, a pre-wired junction box on said bridge frame positioned thereon remote from said first frame, a reflector positioned with its lower edges seated on said second-mentioned flange and its outer walls spaced from said pre-wired junction box to provide a relatively large space between said junction box and the outer walls of the reflector for free circulation of air therethrough, and a lamp socket on said bridge frame and communicating with said reflector, said lamp socket being on the side of said bridge frame remote from that containing said junction box.

5. A recessed type of lighting fixture comprising a reversible frame constituted of vertical walls having a first flange extending laterally from one end of said walls and a second flange extending laterally in the opposite direction than that of said first-mentioned flange, a bridge frame detachably secured to said first-mentioned frame, said bridge frame being relatively narrow with respect to the width of said first-mentioned frame to provide relatively large open spaces on opposite sides of said bridge frame for free circulation of air therethrough, a pre-wired junction box on said bridge frame positioned thereon remote from said reversible frame, a removable reflector position with its lower edges seated on said second-mentioned flange and its outer walls spaced from said pre-wired junction box to provide a relatively large space between said junction box and the outer walls of the reflector for free circulation of air therethrough, and a lamp socket on said bridge frame and communicating with said reflector, said lamp socket being on the side of said bridge frame remote from that containing said junction box.

6. A recessed type of lighting fixture adapted to be inserted in an opening in a ceiling comprising a reversible frame constituted of vertical walls having a laterally extending flange at one edge thereof and a second flange intermediate the top and bottom thereof extending laterally from said reversible flange in a direction opposite to that of said first-mentioned flange; a removable reflector having its forward edges seated on said second flange; said reversible frame functioning as a plaster frame in which case said first-mentioned flange rests on the inside surface of said ceiling and said vertical walls form a plaster frame and when said frame is reversed from the position it occupies as a plaster frame, said first-mentioned flange engaging the exterior of said ceiling and the second-mentioned flange in both positions of said reversible frame providing a seat for the forward edges of said reflector; a bridge frame removably secured to said reversible frame, said bridge frame being constituted of two narrow substantially vertical legs each having one end thereof connected to said reversible frame and the opposite ends connected by a horizontally extending member positioned remote from said reversible frame; a pre-wired junction box in the corner formed by one of said vertical legs and said horizontal member and spaced from the outer walls of said reflector for free circulation of air through said space to maintain said junction box at a relatively low temperature, and a lamp socket on the other of said vertical legs and communicating with said reflector.

7. A recessed type lighting fixture as defined in claim 6 in which the junction box is formed by a housing having a depending portion pivotally mounted to one of said legs and having an extending portion arranged to be removably secured to said horizontally extending member, the side walls of said housing being provided with openings through which the conductor of the lighting fixture and the building wire may be passed for joining in the junction box.

References Cited in the file of this patent

UNITED STATES PATENTS

| 2,376,715 | Naysmith | May 22, 1945 |
| 2,456,903 | Versen | Dec. 21, 1948 |
| 2,602,881 | Pryne | July 8, 1952 |
| 2,648,764 | Krlin | Aug. 11, 1953 |
| 2,701,299 | Florence | Feb. 1, 1955 |